A. Betteley,
Elevator,
N° 23,818.      Patented May 3, 1859.
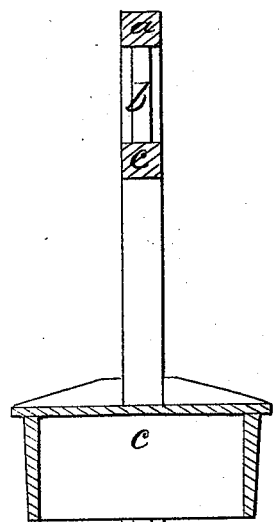
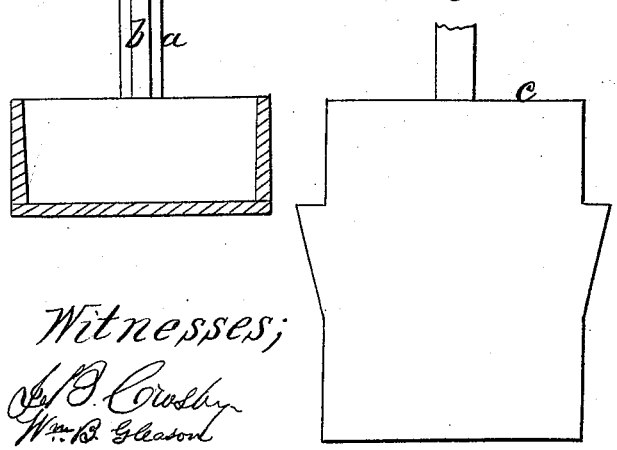
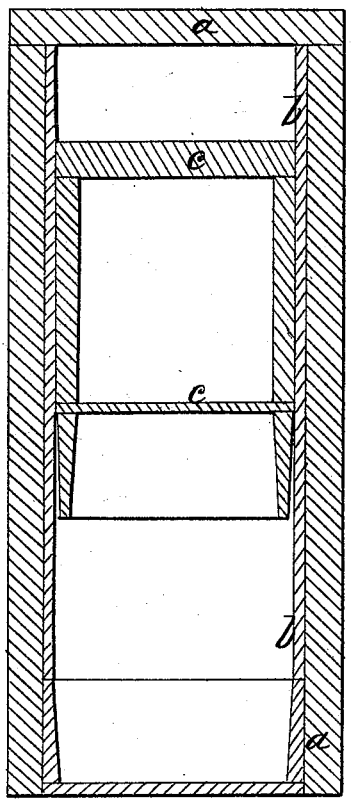
Witnesses;
Inventor;

UNITED STATES PATENT OFFICE.

ALBERT BETTELEY, OF BOSTON, MASSACHUSETTS.

ELEVATOR.

Specification of Letters Patent No. 23,818, dated May 3, 1859.

*To all whom it may concern:*

Be it known that I, ALBERT BETTELEY, of Boston, in the county of Suffolk and State of Massachusetts, have invented a Safety Arrangement to be Applied to and Combined with Elevators; and I do hereby declare that the following is a clear, full, and exact description thereof, reference being had to the accompanying drawings, which form a part of this specification, in which similar letters refer to similar parts.

The object of my invention is to check gradually, in falling, the momentum acquired by the platform or car of an elevator, by a yielding resistance, so as to preserve the lives of persons who may be upon the platform or within the car when any accident occurs that severs the connection between it and the power which controls it, and also, what is of less importance, the structure of the car itself, the frame work and other parts of the elevator, and its foundation, and the building, and any property which may be upon or within the car.

The nature of my invention exists in the mechanical means or their equivalents by which the above object is accomplished, and consists in the new combination which I have made.

Figures 1 and 2, illustrating my invention, are vertical cross sectional elevations, taken in planes at right angles to each other through the frame and platform or car of an elevator.

(*a*) is a frame to which the guides (*b*) are fixed and within which the car or platform (*c*) performs its vertical movements. At the base or foundation of the frame (*a*) a reservoir is formed which may be of any form corresponding with the form of the bottom of the car (*c*). The device which consists of ratchet racks, on the frames (*a*), and pawls, on the car (*c*), arranged to operate so as to prevent the fall of the car when the elevating rope breaks, is well known, and is only mentioned here because of its inefficiency in preventing the fall of the car in many cases, as for instance when some part of the machinery gives way beyond the rope, or where, as may be the case, the rope breaks and is subject to sufficient friction to keep the pawls from falling into the rack until the car acquires such a momentum as to destroy the racks and pawls when they act. While it is well to employ every device which tends to avoid so fearful an accident as the fall of an elevator car must be, provision should be made to decrease, to the utmost, the results which naturally ensue. Taking advantage of the perfect elasticity of the air I have formed a reservoir which will receive the car when it falls, and it will be obvious that all the air in the reservoir which does not escape during the descent of the car therein must be compressed, and will give a yielding but gradually increasing resistance to the onward movement of the car. The base of the car may be constructed with an apron around it like an inverted cup, when it acts in falling in some degree like a "parachute," and it may be made taper as represented in Figs. 1 and 2, but I prefer to have the outside of it of a uniform size as represented in the diagram, Fig. 3, where it will be observed that the top only of the reservoir is tapered. In both of the represented constructions of the base of the car (*c*), and the form of the reservoir, the parachute action is the same. In Figs. 1 and 2 when the car (*c*) enters the reservoir it compresses and displaces the air therein which finds a vent in the space between the sides of the car base and the reservoir which is constantly narrowing, and of course gives a constantly increasing resistance. In Fig. 3 the lower walls of the reservoir are vertical, inclosing a space equal in area and similar in form to the base of the car. The upper part of the reservoir is flaring, so that when the car enters there will be space sufficient for the escape of the air, which prevents shock, but which gradually narrows, giving, of course, constantly increasing resistance until the car reaches the vertical walls of the reservoir when the imprisoned air will resist the onward movement of the car in accordance with the well known law governing the compression of gases modified by its escape through such openings as will exist in practical use.

Having described my invention, what I claim as new therein and desire to secure by Letters Patent of the United States is—

1. The combination of the air reservoir with the movable car or platform of an elevator.

2. Constructing the base of the car (*c*) in the parachute form for the purpose set forth.

ALBERT BETTELEY.

Witnesses:
WILLIAM B. GLEASON,
J. B. CROSBY.